United States Patent
Diaconu et al.

(10) Patent No.: US 10,031,814 B2
(45) Date of Patent: Jul. 24, 2018

(54) COLLECTION RECORD LOCATION AS LOG TAIL BEGINNING

(71) Applicant: Microsoft Technology Licensing, LLC, Redmond, WA (US)

(72) Inventors: Cristian Diaconu, Kirkland, WA (US); Rogerio Ramos, Redmond, WA (US); Raghavendra Thallam Kodandaramaih, Redmond, WA (US); Christian Damianidis, Seattle, WA (US); Arkadi Brjazovski, Redmond, WA (US); Daniel Vasquez Lopez, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 74 days.

(21) Appl. No.: 14/686,480

(22) Filed: Apr. 14, 2015

(65) Prior Publication Data
US 2016/0306713 A1     Oct. 20, 2016

(51) Int. Cl.
G06F 11/00     (2006.01)
G06F 11/14     (2006.01)

(52) U.S. Cl.
CPC ...... *G06F 11/1469* (2013.01); *G06F 11/1446* (2013.01); *G06F 11/1451* (2013.01);
(Continued)

(58) Field of Classification Search
CPC ............. G06F 11/1484; G06F 11/1446; G06F 11/1402; G06F 11/1407; G06F 9/3842;
(Continued)

(56) References Cited

U.S. PATENT DOCUMENTS 5,721,815 A    2/1998   Ottesen et al.
5,806,075 A    9/1998   Jain et al.
(Continued)

FOREIGN PATENT DOCUMENTS

CN      101625655 B     5/2011

OTHER PUBLICATIONS

Wigmore, "What is log (log file)" Nov. 2014, WhatIs.com, p. 1.*
(Continued)

*Primary Examiner* — Bryce P Bonzo
*Assistant Examiner* — Jeison C Arcos
(74) *Attorney, Agent, or Firm* — Workman Nydegger

(57) ABSTRACT

The logging of tasks associated with multiple transactions in the context in which the computing system is capable of having multiple of the transactions active at a given time, and thus in which the order of completion of the transactions is not guaranteed to be the same as the order of initiation of the transactions. A sequence of transaction segment records is added to the log. Each transaction segment record comprises a transaction identifier range that does not overlap with the transaction identifier range in any of the sequence of transaction segment records including the transaction identifier range of any neighboring transaction segment record in the sequence of transaction segment records. Each transaction segment record also includes a log entry identifier range extending from the first task of the first of the transactions to be initiated to the last task of the last transaction to complete.

18 Claims, 8 Drawing Sheets

(52) U.S. Cl.
CPC ...... *G06F 11/1471* (2013.01); *G06F 11/1474* (2013.01); *G06F 2201/805* (2013.01); *G06F 2201/84* (2013.01)

(58) Field of Classification Search
CPC .............. G06F 2201/80; G06F 11/141; G06F 11/1471; G06F 11/1474; Y10S 707/99953
See application file for complete search history.

(56) References Cited

U.S. PATENT DOCUMENTS

| | | | |
|---|---|---|---|
| 5,845,292 A * | 12/1998 | Bohannon | G06F 11/1469 |
| 6,052,695 A | 4/2000 | Abe | |
| 6,154,847 A | 11/2000 | Schofield et al. | |
| 6,349,310 B1 | 2/2002 | Klein et al. | |
| 6,353,828 B1 | 3/2002 | Ganesh et al. | |
| 6,397,227 B1 | 5/2002 | Klein et al. | |
| 6,446,086 B1 | 9/2002 | Bartlett et al. | |
| 6,477,546 B1 | 11/2002 | Torbert et al. | |
| 6,484,181 B2 | 11/2002 | Attaluri et al. | |
| 6,625,601 B1 | 9/2003 | Molloy | |
| 6,728,719 B1 | 4/2004 | Ganesh et al. | |
| 6,801,938 B1 | 10/2004 | Bookman et al. | |
| 7,007,269 B2 | 2/2006 | Sluiman et al. | |
| 7,293,145 B1 | 11/2007 | Baird et al. | |
| 7,451,168 B1 * | 11/2008 | Patterson | G06F 12/0269 |
| 7,487,160 B2 | 2/2009 | Whyte | |
| 7,512,740 B2 | 3/2009 | Diefendorff | |
| 7,519,628 B1 | 4/2009 | Leverett et al. | |
| 7,761,766 B2 | 7/2010 | Boldt et al. | |
| 7,844,760 B2 | 11/2010 | Jeyaseelan et al. | |
| 8,032,885 B2 | 10/2011 | Fish | |
| 8,352,425 B2 | 1/2013 | Bourbonnais et al. | |
| 8,489,655 B2 | 7/2013 | Aronovich et al. | |
| 8,589,890 B2 | 11/2013 | Eccles et al. | |
| 8,650,169 B1 | 2/2014 | Jacobs et al. | |
| 8,671,085 B2 | 3/2014 | Dhamankar et al. | |
| 8,719,462 B1 | 5/2014 | He et al. | |
| 8,738,568 B2 | 5/2014 | Ghosh et al. | |
| 8,745,012 B2 * | 6/2014 | Rusher | G06F 17/30309 707/638 |
| 8,850,452 B2 | 9/2014 | Vishnu | |
| 8,868,234 B2 | 10/2014 | Sanders et al. | |
| 8,868,527 B1 | 10/2014 | Fallis et al. | |
| 8,880,480 B2 * | 11/2014 | Kundu | G06F 11/1471 707/674 |
| 9,138,652 B1 | 9/2015 | Thompson et al. | |
| 9,256,477 B2 | 2/2016 | Truong et al. | |
| 9,262,519 B1 | 2/2016 | Saurabh et al. | |
| 9,418,094 B2 | 8/2016 | Wong et al. | |
| 9,460,008 B1 | 10/2016 | Leshinksy et al. | |
| 9,563,397 B1 | 2/2017 | Stoev et al. | |
| 9,619,544 B2 | 4/2017 | Vermeulen et al. | |
| 9,760,617 B2 | 9/2017 | Shang et al. | |
| 2002/0103683 A1 | 8/2002 | Tsuda | |
| 2002/0120929 A1 | 8/2002 | Schwalb et al. | |
| 2002/0188831 A1 | 12/2002 | Jackson et al. | |
| 2003/0061537 A1 * | 3/2003 | Cha | G06F 11/1471 714/16 |
| 2005/0223366 A1 | 10/2005 | Smith et al. | |
| 2006/0212492 A1 | 9/2006 | Jacobs et al. | |
| 2007/0220356 A1 * | 9/2007 | Ruscio | G06F 9/466 714/42 |
| 2007/0255979 A1 | 11/2007 | Deily et al. | |
| 2008/0058961 A1 | 3/2008 | Biberdorf et al. | |
| 2008/0066055 A1 * | 3/2008 | Shebs | G06F 11/36 717/124 |
| 2008/0140733 A1 * | 6/2008 | Chan | G06F 11/1471 |
| 2008/0270403 A1 | 10/2008 | Bookman et al. | |
| 2008/0270838 A1 | 10/2008 | Dorai et al. | |
| 2009/0150599 A1 * | 6/2009 | Bennett | G06F 11/1441 711/103 |
| 2009/0287874 A1 | 11/2009 | Rogers et al. | |
| 2009/0287890 A1 * | 11/2009 | Bolosky | G06F 3/061 711/155 |
| 2010/0185895 A1 | 7/2010 | Clark et al. | |
| 2010/0215143 A1 | 8/2010 | Basu et al. | |
| 2011/0029490 A1 * | 2/2011 | Agarwal | G06F 9/467 707/684 |
| 2011/0082835 A1 * | 4/2011 | Agrawal | G06F 17/30194 707/646 |
| 2011/0161723 A1 | 6/2011 | Taleck et al. | |
| 2011/0202546 A1 | 8/2011 | Amit et al. | |
| 2011/0264898 A1 * | 10/2011 | Chaudhry | G06F 9/3842 712/228 |
| 2012/0109895 A1 | 5/2012 | Zwilling et al. | |
| 2012/0209817 A1 | 8/2012 | Golab et al. | |
| 2012/0278288 A1 | 11/2012 | Deshmukh et al. | |
| 2012/0290752 A1 | 11/2012 | Lim | |
| 2013/0117233 A1 | 5/2013 | Schreter | |
| 2013/0117234 A1 | 5/2013 | Schreter | |
| 2013/0232400 A1 | 9/2013 | Finnell et al. | |
| 2013/0290268 A1 | 10/2013 | Schreter | |
| 2013/0290649 A1 | 10/2013 | Jorgensen et al. | |
| 2013/0332435 A1 | 12/2013 | Bernstein et al. | |
| 2014/0007119 A1 | 1/2014 | Liu et al. | |
| 2014/0032595 A1 | 1/2014 | Makkar et al. | |
| 2014/0172803 A1 | 6/2014 | Diaconu et al. | |
| 2014/0244701 A1 | 8/2014 | Welton et al. | |
| 2014/0279930 A1 * | 9/2014 | Gupta | G06F 11/1464 707/683 |
| 2015/0100708 A1 * | 4/2015 | Kegel | G06F 11/3476 710/18 |
| 2015/0127679 A1 | 5/2015 | Wing | |
| 2015/0363396 A1 | 12/2015 | Sengupta et al. | |
| 2016/0147859 A1 | 5/2016 | Lee et al. | |
| 2016/0306654 A1 | 10/2016 | Diaconu et al. | |
| 2016/0306659 A1 | 10/2016 | Diaconu et al. | |
| 2016/0306838 A1 | 10/2016 | Diaconu et al. | |
| 2016/0306839 A1 | 10/2016 | Diaconu et al. | |
| 2016/0306841 A1 | 10/2016 | Diaconu et al. | |
| 2016/0306856 A1 | 10/2016 | Diaconu et al. | |

OTHER PUBLICATIONS

Randal, "Disaster recovery 101: backing up the tail of the log", Jun. 18, 2010, https://www.sqlskills.com, pp. 1-4.*
Randal, "Advanced Backup and Restore Options", May 18, 2011, http://sqlmag.com, pp. 1-7.*
Poolet, "Advanced Backup and Restore Options", May 27, 2008, http://sqlmag.com, pp. 1-8.*
Poolet, "What Is a TailLog Backup?", Feb. 24, 2008, http://sqlmag.com, p. 1.*
Office Action dated Mar. 9, 2016 cited in U.S. Appl. No. 14/686,525.
Final Office Action dated Aug. 9, 2016 cite in U.S. Appl. No. 14/686,525.
International Search Report and Written Opinion for PCT Application No. PCT/US2016/026854, dated Jul. 18, 2016.
Haraty, et al., "Damage Assessment and Recovery from Malicious Transactions Using Data Dependency for Defensive Information Warfare", In Proceedings of Science and Technology Vision, vol. 3, No. 4, Nov. 2007, pp. 43-50.
Patnaik, et al., "Transaction-Relationship Oriented Log Division for Data Recovery from Information Attacks", In Journal of Database Management, vol. 14, Issue 2, Apr. 2003, 3 pages.
Faleiro, et al., "Lazy Evaluation of Transactions in Database Systems", In Proceedings of ACM SIGMOD International Conference on Management of Data, Jun. 22, 2014, pp. 15-26.
Lomet, David, "Application Recovery: Advances toward an Elusive Goal", In Proceedings of International Workshop on High Performance Transaction Systems, Sep. 9, 4 pages.
"Oracle GoldenGate Performance Best Practices", In Oracle White Paper, Nov. 2014, 51 pages.
Diaconu, et al., "Hekaton: SQL Server's Memory-Optimized OLTP Engine", In Proceedings of ACM SIGMOD International Conference on Management of Data, Jun. 22, 2013, pp. 1243-1254.
"Set Segmenting Specification VI", Retrieved on: Dec. 18, 2014, Available at: http://zone.ni.com/reference/en-XX/help/372846H-01/veristandmerge/set_segmenting_specification/.

(56) References Cited

OTHER PUBLICATIONS

"International Preliminary Report on Patentability Issued in PCT Application No. PCT/US2016/026854", dated Oct. 21, 2016, 7 Pages.
Office Action dated Sep. 19, 2016 issued in U.S. Appl. No. 14/686,515.
Notice of Allowance dated Mar. 9, 2017 cited in U.S. Appl. No. 14/686,525.
Office Action dated Mar. 27, 2017 cited in U.S. Appl. No. 14/686,515.
Notice of Allowance issued in U.S. Appl. No. 14/686,525 dated May 12, 2017.
Office Action dated Jul. 3, 2017 cited in U.S. Appl. No. 14/686,544.
Office Action dated Jul. 28, 2017 cited U.S. Appl. No. 14/686,560.
Office Action issued in U.S. Appl. No. 14/686,544 dated Jan. 24, 2018.
Office Action issued in U.S. Appl. No. 14/868,560 dated Jan. 24, 2018.
Office Action issued in U.S. Appl. No. 14/686,503 dated Jan. 31, 2018.
Office Action issued in U.S. Appl. No. 14/686,494 dated Sep. 13, 2017.
Ferri, Cesare: "Energy Efficient Synchronization Techniques for Embedded Architectures," 2008.
Notice of Allowance issued in U.S. Appl. No. 14/686,515 dated Dec. 27, 2017.
Office Action issued in U.S. Appl. No. 14/686,503 dated Sep. 19, 2017.

* cited by examiner

COLLECTION RECORD LOCATION AS LOG TAIL BEGINNING

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Often, tasks performed on a data system are logged. For instance, each tasks performed has an associated entry in a log, with the entry having a log entry identifier (such as a log sequence number). Data systems are quite complex, and thus sometimes data systems fail. In order to recover from a failure, the most recent checkpointed data is recovered, and then a latter portion of the log is applied to bring the computing system as close as possible to what it was prior to the failure. This latter portion of the log is often referred to as the "tail of the log" or the "log tail".

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to recovering in a system that has multiple collections of events, each collection having associated therewith a collection record in a log. During recovery, checkpointed data is recovered into the system. The checkpointed data includes a last collection of events.

A beginning of the tail of the log to be applied is also identified, which may well include records that are within the checkpoint. The identification is based on the location of a collection record in the log. The recovery then continues by redoing the tail of the log in the system from the identified beginning of the tail of the log. In one embodiment, the collection record for each of the multiple collections occurs in the log after a last event of the corresponding collection. Furthermore, in that embodiment, the log includes a sequence of collection records that are ordered as the associated collections are encountered in the log. In that circumstance, there will be no events for collections after the last collection already checkpointed that are before a location of a collection record for a next to last collection of events already checkpointed. This fact aids in finding the tail of the log, and keeping that tail of the log short, thereby aiding in rapid recovery of the system.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiments described herein relate to recovering in a system that has multiple collections of events, each collection having associated therewith a collection record in a log. During recovery, checkpointed data is recovered into the system. The checkpointed data includes a last collection of events.

A beginning of the tail of the log to be applied is also identified, which may well include records that are within the checkpoint. The identification is based on the location of a collection record in the log. The recovery then continues by redoing the tail of the log in the system from the identified beginning of the tail of the log. In one embodiment, the collection record for each of the multiple collections occurs in the log after a last event of the corresponding collection. Furthermore, in that embodiment, the log includes a sequence of collection records that are ordered as the associated collections are encountered in the log. In that circumstance, there will be no events for collections after the last collection already checkpointed that are before a location of a collection record for a next to last collection of events already checkpointed. This fact aids in finding the tail of the log, and keeping that tail of the log short, thereby aiding in rapid recovery of the system.

Some introductory discussion of a computing system will be described with respect to FIG. 1. Then, the creation and use of the sequence of collection records within a log will be described with respect to FIGS. 2 through 8. Then, the recovery in accordance with the principles herein will be described with respect to FIGS. 9 and 10.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
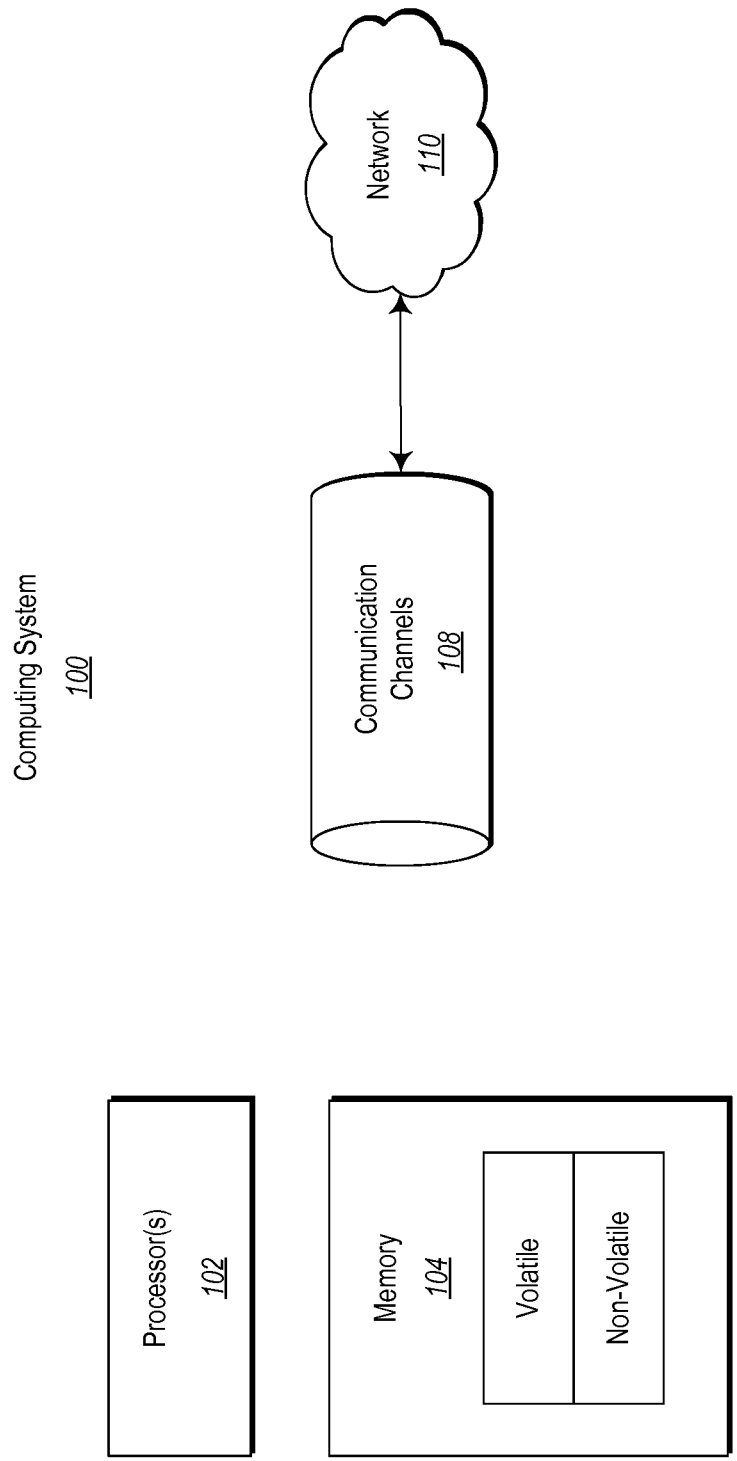
FIG. 1 abstractly illustrates a computing system in which some embodiments described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data, which when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
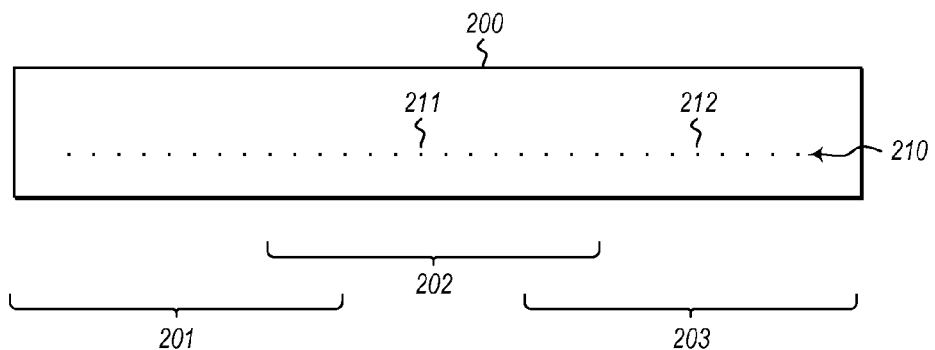
FIG. 2 abstractly illustrates a log that might be kept by a computing system such as the computing system of FIG. 1, in which there are several event collections that overlap in log entries.

FIG. 2 abstractly illustrates a log 200 that might be maintained by a computing system such as the computing system 100 of FIG. 1. As symbolically represented by represented the continuous ellipses 210, the log 200 is filled with events. Each event may correspond to an associated collection of events that has one or more common attributes or properties. Each associated collection of events may overlap (as far as the data stream address is concerned) with one or more other collections of events within the log 200.

The attributes and parameters of the collections are selected (thereby defining the collection) so that parallel processing of the collections of events is enhanced. For instance, the attributes and parameters may be selected such that dependencies between collections are eliminated or reduced and such that the collections can be processed in parallel. If there is a dependency between collections, such may be noted, and accounted for during subsequent processing. Parallel processing may be further enhanced by guarantying a compactness condition with respect to the attribute or property defining a collection. That is to say, the attributes or properties are defined in such a way that an event belongs to only one collection. In accordance with the principles described herein, a collection record is associated with each collection of events within the log, and appears in the log 200 in the same order as the collection is encountered in the data stream. Specifically, the confirmation that a collection record is persisted allows the next one to be persisted. Therefore these collection records will be in order in the data stream.

For instance, referring back to FIG. 2, bracket 201 shows a range of events spanning from the first event of a first collection to the last event of the first collection. Accordingly, all events within the first collection are within the bracket 201, though the bracket 201 may also include some events from other collections of events. There is an associated collection record 211 for the collection encompassed by bracket 201, and that is inserted in the log 200 after the last item in the first collection (i.e., to the right of the bracket 201).

Likewise, bracket 202 shows a range of events spanning from the first event of a second collection to the last event of the second collection. Accordingly, all events within the second collection are within the bracket 202, though the bracket 202 may also include some events from other collections of events. For instance, since brackets 201 and 202 overlap, there are events from both the first collection and the second collection in the log 200 where the brackets 201 and 202 overlap. There is also an associated collection record 212 (to the right of bracket 202) for the second collection encompassed by bracket 202.

Finally, bracket 203 shows a range of events spanning from the first event of a third collection to the last event of the third collection. Accordingly, all events within the third collection are within the bracket 203, though the bracket 203 may also include some events from other collections of events. For instance, since brackets 202 and 203 overlap, there are events from both the second collection and the third collection in the log 200 where the brackets 202 and 203 overlap. There is also an associated collection record (not shown) for the third collection encompassed by bracket 203 that would appear after the last event in the third collection within the log 200 (i.e., to the right of bracket 203 in the log 200).

In this description and in the claims, a particular collection of events would "overlap" a comparison collection of events if 1) any event within the particular collection of events is interspersed between the first and last events of the comparison collection within the log, or 2) any event within the comparison collection of events is interspersed between the first and last events of the particular collection within the log.

The ellipses 210 represent events in the log 200. In one example, events representing tasks performed in a data system (such as a database system). In particular, perhaps the collection of events is defined by a transaction identifier, or a transaction identifier range. Thus, all log entries having a first transaction identifier range are in a first collection (also called a transaction segment), and all log entries having a second transaction identifier range are in a second transaction segment. Selecting collections by non-overlapping transaction identifier ranges allows the collections (i.e., the transaction segments) to be processed more suitably in parallel since each log entry will belong to, at most, one transaction segment.

In data systems that perform multiple transactions simultaneously, the last task of the latest completed transaction in a prior non-overlapping transaction identifier range may indeed be completed after the first task of the first transaction of the subsequent non-overlapping transaction identifier range is initiated. Since transactions are performed by the computing system 100 in parallel with multiple transactions being active at a time, the order of completion of the transactions is not guaranteed, and often is not, the same as the order that the transactions were initiated. After all, some transactions may be more long running than others just due to the wide variety of transactions that may be performed. Thus, transaction segments meet the compactness condition with respect to transaction identifiers, but do not guaranty or even aim to meet the compactness condition with respect to log entries. That is to say, a log entry that falls between the first and last log entries of a particular transaction segment may not actually belong to the transaction segment.

When applying the broader principles in cases in which the log is a transactional log of a transactional data system, and in which the collections are transaction segments defined by a transaction identifier range (hereinafter called the "transactional log example"), the collection record may be called a "transaction segment record". Since a collection record is created for each collection, when applying the principles to the transactional log example, a transaction segment record is created for transactions within a particular transaction identifier range. Although the principles described herein may apply to any log having overlapping collections of events, the description will now focus more on the specific transactional log example.

In this description and in the claims, a particular transaction identifier range would "overlap" a comparison transaction identifier range if 1) any transaction identifiers within the particular transaction identifier range was indicative of being a transaction completed (i.e., committed or aborted) between an earliest and latest completed transactions of the comparison transaction identifier range or 2) any transaction identifiers within the comparison transaction identifier range was indicative of being a transaction completed between an earliest and latest completed transactions of the particular transaction identifier range.

For instance, suppose that the computing system assigns monotonically increasing transaction identifiers as new transactions are completed. Now suppose the particular transaction identifier range included transaction identifiers 4, 6 and 8. Suppose further that the comparison transaction identifier range included transaction identifiers 7, 9 and 10. In that case, the particular transaction identifier range overlaps with the comparison transaction identifier range because the particular transaction identifier range includes a transaction identifier 8 which is indicative of the associated transaction being completed between an earliest completed transaction (having transaction identifier 7) and a latest completed transaction (having transaction identifier 10) of the comparison transaction identifier range. As a separate reason for overlap, the comparison transaction identifier range includes a transaction identifier 7 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 9, 10, 11. Now there is no overlap because both conditions of non-overlap are satisfied. Specifically, the first condition is that the particular transaction identifier range includes no transaction identifiers (the highest being transaction identifier 8) which is indicative of the associated transaction being completed between an earliest completed transaction (having transaction identifier 9) and a latest completed transaction (having transaction identifier 11) of the comparison transaction identifier range. The second condition is that the comparison transaction identifier range includes no transaction identifiers (the lowest being transaction identifier 9) which is indicative of the associated transaction being completed between an earliest completed transaction (having transaction identifier 4) and a latest completed transaction (having transaction identifier 8) of the particular transaction identifier range.

The non-overlapping conditions also apply when the comparison transaction identifier range includes transactions completed earlier than the transactions of the particular transaction identifier range. For instance, suppose that the comparison transaction identifier range includes transaction identifiers 1, 2 and 5. In that case, the particular transaction identifier range overlaps with the comparison transaction identifier range because the particular transaction identifier range includes a transaction identifier 4 which is indicative of the associated transaction being completed between an earliest completed transaction (having transaction identifier 1) and a latest completed transaction (having transaction identifier 5) of the comparison transaction identifier range. As a separate reason for overlap, the comparison transaction identifier range includes a transaction identifier 5 which is indicative of the associated transaction being completed between an earliest completed transaction (having transaction identifier 4) and a latest completed transaction (having transaction identifier 8) of the particular transaction identifier range.

Now suppose that the comparison transaction identifier range included transaction identifiers 1, 2 and 3. Now there is no overlap because both conditions of non-overlap are satisfied. Specifically, the first condition is that the particular transaction identifier range includes no transaction identifiers (the lowest being transaction identifier 4) which is indicative of the associated transaction being completed between an earliest completed transaction (having transaction identifier 1) and a latest completed transaction (having transaction identifier 3) of the comparison transaction identifier range. The second condition is that the comparison transaction identifier range includes no transaction identifiers (the highest being transaction identifier 3) which is indicative of the associated transaction being completed between an earliest completed transaction (having transaction identifier 4) and a latest completed transaction (having transaction identifier 8) of the comparison transaction identifier range.

As an example, suppose there were three transaction segment identifier ranges: a first associated with transaction identifiers 0 through 2; a second associated with transaction identifiers 3 through 5; and a third associated with transaction identifiers 6 through 8. In this case, the first, second, and third transaction identifier ranges do not overlap. The non-overlapping condition with respect to transaction identifiers is referred to as the "compactness" condition with respect to transaction identifiers. However, the meeting of the compactness condition with respect to transaction identifiers does not mean that the compactness condition is met with respect to the log entries themselves.

Figure 3:
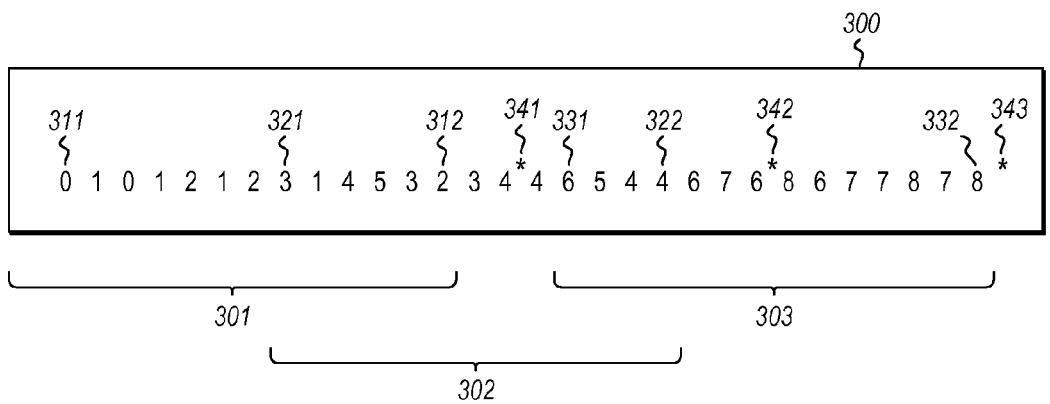
FIG. 3 illustrates a more specific example of a transactional log that represents an example of the log of FIG. 2.

FIG. 3 illustrates a more specific example log 300 that represents an example of the log 200 of FIG. 2, in which the first brackets 301 is associated with transaction identifiers 0 through 2; the second brackets 302 is associated with transaction identifiers 3 through 5, and the third brackets 303 is associated with transaction identifiers 6 through 8. Each number within the log 300 represents a task entry having the number as the associated transaction identifier.

Figure 4:
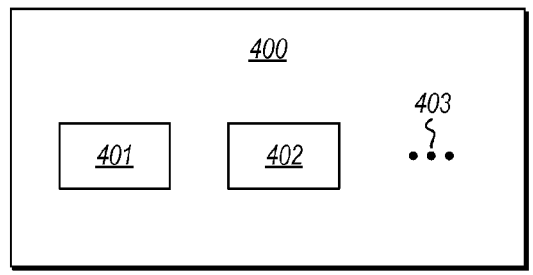
FIG. 4 illustrates a collection record in accordance with the principles described herein.

FIG. 4 illustrates a collection record 400 in accordance with the principles described herein. The collection record 400 includes a collection definition field 401 that defines the properties that an event is to meet in order to be considered part of the collection. For instance, if the collection record 400 were applied in the transactional log example, the collection record 400 would be a transaction segment record. The field 401 would further include the transaction identifier range associated with the transaction segment.

There would be a collection record 400 created for each collection of events within the log. As applied to the transactional log example, there would be a transaction segment record created for each non-overlapping transaction identifier range. For instance, there may be a transaction segment record for each of the non-overlapping transaction identifier ranges 301, 302 and 303 of FIG. 3. Other examples of collection definitions might include which device created the data item, a region from which the data item originated, a semantic and/or syntactic rule set followed by the data item, a timeframe in which a data set was created or registered, and so forth.

The collection record 400 also includes log address range field 402 that defines the extent of the collection within the log. For instance, the log address range field defines a location at or prior to the first appearance of an event of the associated collection within the log, and defines a location at or after the last appearance of an event of the associated collection within the log. For instance, as applied to the transactional log example, the log address range field 402 may define a log entry identifier range 402. An example of a log entry identifier is a log sequence number (LSN). Accordingly, an example of a log entry identifier range is a log sequence number range. The collection record 400 also includes potentially other fields 403, and thus is not limited to the collection definition field 401 and the log address range field 402.

For the transaction identifier range 0 to 2 associated with the bracket 301, the collection record 400 would identify the transaction identifier range 0 to 2 within field 401. The collection record 400 would also include within field 402 a log entry identifier range beginning at the first task entry 311 associated with the first initiated transaction of the transaction identifier range and ending at the last task entry 312 associated with the last completed transaction of the transaction identifier range. The collection record 400 may then be placed as a transaction segment record in the log after the last task entry 312. For instance, asterisk 341 may represent the transaction segment record for transaction identifier range 0 to 2 spanning bracket 301.

For the transaction identifier range 3 to 5 associated with the bracket 302 the collection record 400 would identify the transaction identifier range 3 to 5 within field 401. The collection record 400 would also include within field 402 a log entry identifier range beginning at the first task entry 321 associated with the first initiated transaction of the transaction identifier range and ending at the last task entry 322 associated with the last completed transaction of the transaction identifier range. The collection record 400 may then be placed as a transaction segment record in the log after the last task entry 322. For instance, asterisk 342 may represent the transaction segment record for transaction identifier range 3 to 5 spanning bracket 302.

For the transaction identifier range 6 to 8 associated with the bracket 303 the collection record 400 would identify the transaction identifier range 6 to 8 within field 401. The collection record 400 would also identify within field 402 a log entry identifier range beginning at the first task entry 331 associated with the first initiated transaction of the transaction identifier range and ending at the last task entry 332 associated with the last completed transaction of the transaction identifier range. The collection record 400 may then be placed as a transaction segment record in the log after the last task entry 332. For instance, asterisk 343 may represent the transaction segment record for transaction identifier range 6 to 8 spanning bracket 303.

In some embodiments, the confirmation that a transaction segment definition record is persisted allows the next one to be persisted. Therefore these transaction segment records will be in transaction identifier order in the log. Accordingly, in FIG. 3, the transaction segment record 341 associated with transaction identifier range 0 to 2 is placed in the log 300 prior to the transaction segment record 342 associated with the transaction identifier range 3 to 5. Likewise, the transaction segment record 342 associated with transaction identifier range 3 to 5 is placed in the log 300 prior to the transaction segment record 343 associated with the transaction identifier range 6 to 8. In the broader context, the order of the collection records with the log may be the same as the order in which each associated collection is encountered in the log.

Figure 5:
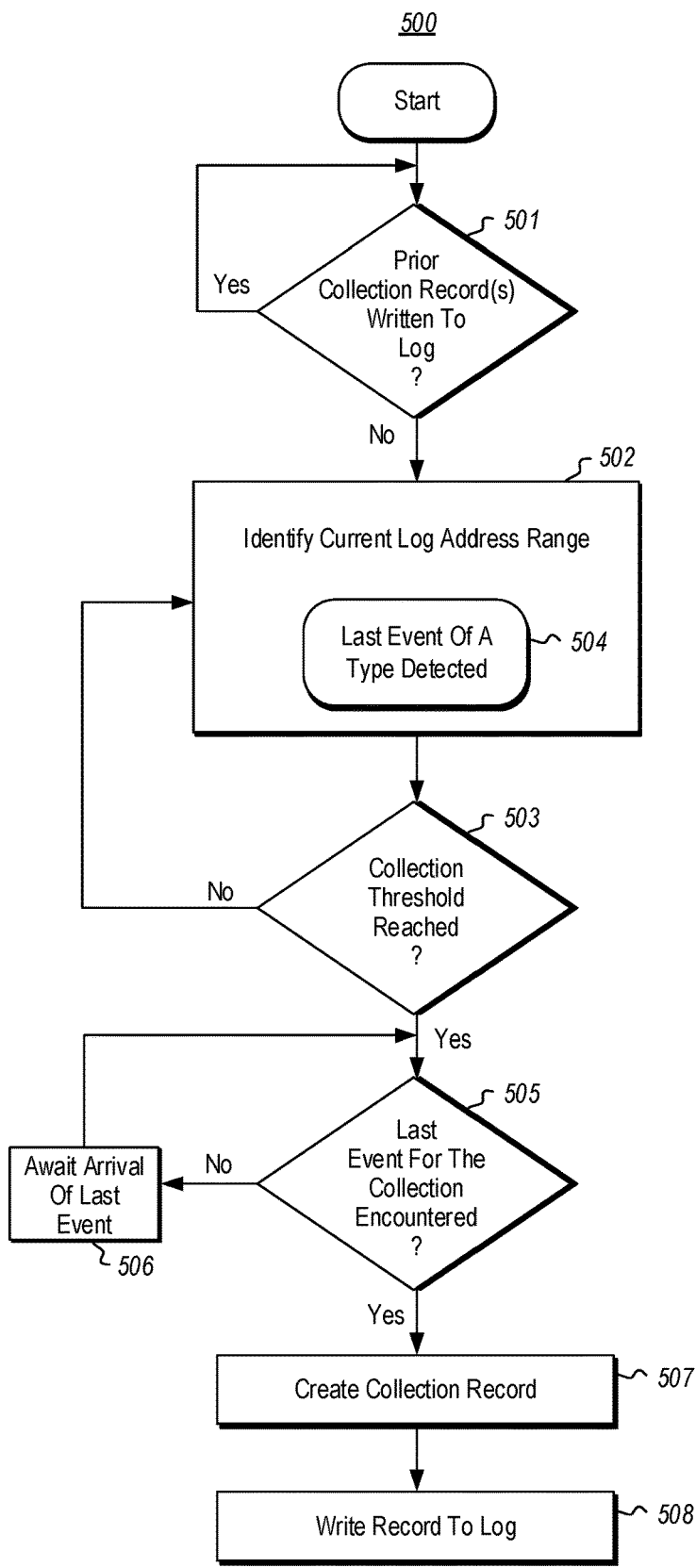
FIG. 5 illustrates a flowchart of a method for creating a collection record, which may be used to create each collection record in the sequence of collection records.

FIG. 5 illustrates a flowchart of a method 500 for creating a collection record, which may be used to create each collection record in the sequence of collection records. For instance, with reference to FIG. 3, the method 500 may be applied three times to generate transaction segment records 341, 342 and 343.

It is determined whether any prior collection records, if any, in the sequence of collection records have been inserted into the log (decision block 501). In the transactional log example, the more specific determination would be whether any prior transaction segment record, if any, in the sequence of transaction segment records are yet to be written to the log.

For instance, transaction segment record 341 is the first transaction segment record 341 in the sequence of three transaction segment records of FIG. 3. Accordingly, there are no prior transaction segment records that are to be written to the log ("Yes" in decision block 501). If the method 500 were being performed with respect to the transaction segment record 342, then transaction segment record 341 would first be written to the log in order to follow the "Yes" branch in the decision block 501 of FIG. 5. If the method 500 were being performed with respect to the transaction segment record 343, then transaction segment record 342 would first be written to the log in order to follow the "Yes" branch in the decision block 501 of FIG. 5. If there did exist prior transaction segment records that are yet to be written to the log ("No" in decision block 501), then the method 500 would simply await the writing of all prior transaction segment records in the sequence to be written to the log.

Upon determining that all prior collection records have been written to the log ("Yes" in decision block 501), a current collection definition of the current collection is identified (act 502). In the context of the transactional log example, the latest present transaction identifier of the transaction segment record is identified. The beginning of the transaction identifier range to the latest present transaction identifier defines a current transaction identifier range for the transaction segment record.

It is then determined whether a threshold has been reached with respect to the collection (decision block 503) based on the current collection definition. An example of such a threshold might be a time-based threshold. For instance, the collection might remain open for a certain amount of time. Alternatively, the collection might close upon encountering a time threshold since the last new transaction or particular event type was encountered in the data stream. The principles described herein contemplate any threshold. In the description which follows, an example threshold will be described in term of a size threshold. For instance, in the context of the transactional log example, this size may be defined as the cumulative sum of all of the sizes of the transactions as expressed in binary representation. If the collection has not reached a particular threshold ("No" in decision block 503), then the method 500 returns to act 502.

The current collection definition associated with a collection may broaden as further events are evaluated in the log. This will result from detection (event 504) of a last event of a particular type that falls outside of the current collection definition, but which could fall inside the collection definition if modified, without losing the compactness condition for that collection definition. For instance, in the transactional log example, the present latest transaction identifier may change resulting in a new identification of the present latest transaction identifier if transactions later than a present latest transaction identifier are detected as completed. This would result in expansion in the current transaction identifier range for the transaction segment record. In the case in which monotonically increasing transaction identifiers are assigned at transaction completion time, this simplifies the process of expanding the transaction identifier range.

Event 504 remains active as a possibility until the collection has reached the particular threshold ("Yes" in decision block 503). The event 504 being active means that the current collection definition may still expand. However, once the collection has reached the particular threshold ("Yes" in decision block 503), the collection transitions from an open state to a closing state. Hereafter, a collection is in an "open state" if the current collection definition may change, and a "closing state" if the collection definition may not change. In some embodiment, the decision block 503 is optional, and thus the collection transitions from the open state (in which the current collection definition may expand) to a closing state (in which the collection definition is fixed) immediately, or in response to some other condition.

For instance, as applied to the transactional log example, in the case of the particular threshold being a size, if the size of the transaction segment reaches a certain size, then the transaction identifier range of that transaction segment may no longer expand. Thus, the transaction segment transitions from an open state to a closing state, such that a change in the transaction identifier range is no longer accepted in response to detecting completion of subsequent transactions.

Once the state transition occurs, it is then determined whether the last event for the collection has been encountered in the log (decision block 505). For instance, in the context of the transactional log example, it is then determined whether there are any transactions have a transaction identifier within the present transaction identifier range that have not yet completed, either by being committed or aborted.

If the last event of the collection has not yet been encountered in the log ("No" in decision block 505), then the method awaits encountering of the last event of the collection (act 506). In the context of the transactional log example, if all of the transactions having a transaction identifier within the transaction identifier range have not been completed, then the method awaits completion of all of such transactions.

Otherwise, if the last event of the collection has been encountered in the log ("Yes" in decision block 505), the collection record is created (act 507), and placed into the log (act 508). In the context of the transactional log example, if all of the transactions having a transaction identifier within the transaction identifier range have been completed, then the transaction segment record is created, and placed into the log. The placing of the collection record in the log may result in a future iteration of the method 500 with respect to the subsequent collections branching along the "Yes" branch of FIG. 5.

Figure 6:
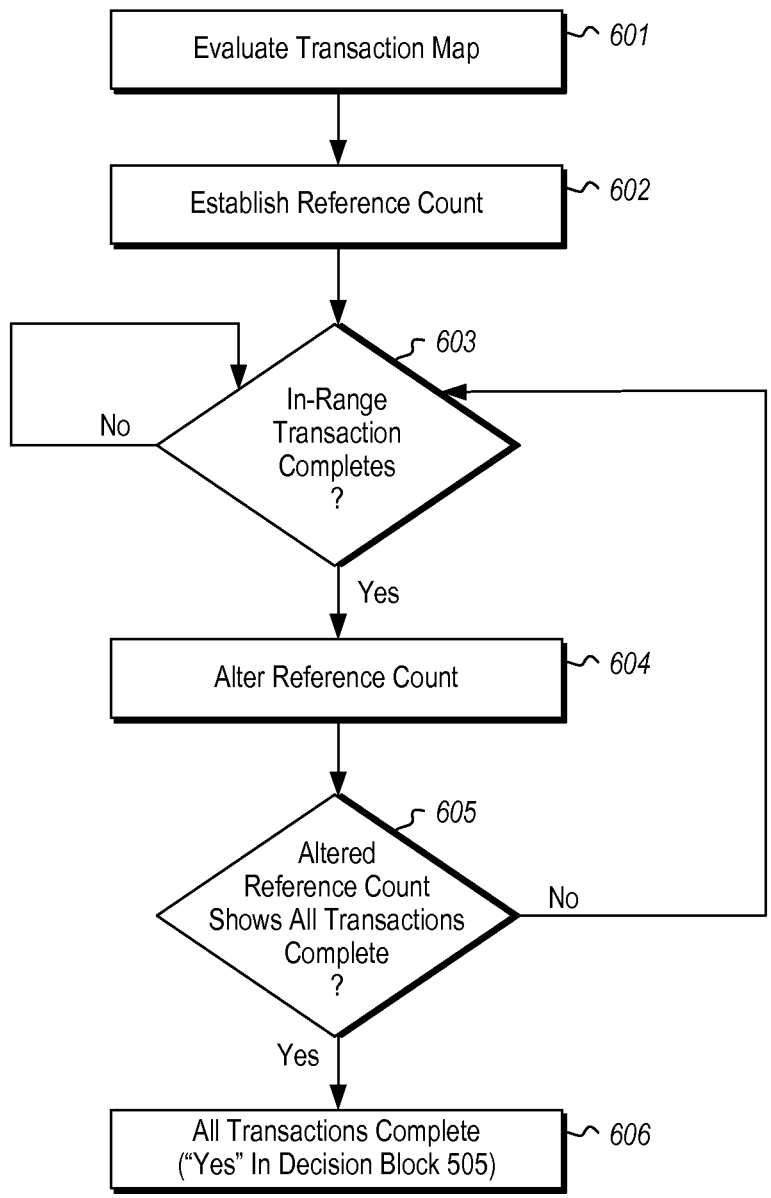
FIG. 6 illustrates a flowchart of a method for determining if there are any transactions having a transaction identifier within the present transaction identifier range that have not yet completed.

FIG. 6 illustrates a flowchart of a method 600 for determining if there are any transactions having a transaction identifier within the present transaction identifier range that have not yet completed. The method 600 represents one example of how decision block 505 might be performed in the transactional log example. First, a transaction map is evaluated that shows active transactions according to transaction identifier (act 601). Then a reference count is established based on how many active transactions there are within the transaction identifier range (act 602) that have not yet completed. If a transaction having a transaction identifier within the transaction identifier range is not detected as completed ("No" in decision block 603), then the method 600 remains at decision block 603.

Thereafter, however, each time a transaction having a transaction identifier within the transaction identifier range is detected as completed ("Yes" in decision block 603), the reference count is altered (act 604) so as to represent a decrementing of the identified number of transactions within the transaction identifier range that having not yet completed. If the reference count still represents that one or more transactions are yet to be completed ("No" in decision block 605), then the method 600 returns to decision block 603 to await another indication that a transaction within range of the transaction identifier range has completed. Otherwise ("Yes" in decision bloc 605), if the reference count indicates that all transactions have completed, then the method 600 ends (act 606) resulting in a branching along the "Yes" branch of decision block 505 of FIG. 5. Again, this would result in creation of the transaction segment record (act 507) and the writing of the transaction segment record to the log (act 508).

Previously, this description has mentioned that when a collection is in an open state, the collection may receive notifications that the last entry of events having a parameter has been encountered, resulting in potentially broadening of the current collection definition to encompass the scope of that parameter. However, when the collection transitions to a closing state, the collection no longer expands the collection definition associated with the collection. In one embodiment, the open collection may be represented by a data structure that is relatively small—such as perhaps 256 or even 128 bits or less. This allows changes to be made to the open collection data structure in one processing cycle, thereby ensuring that changes to the open collection data structure are made atomically. Thus, the open collection data structure may be lockless, such that no locks need be taken on that data structure. Such allows for efficient management of the open collection data structure such that millions of collections may be processed per second.

Figure 7:
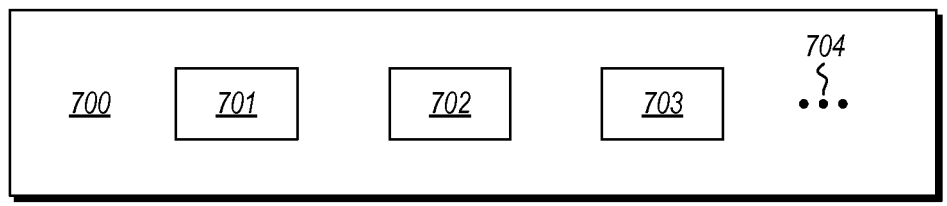
FIG. 7 illustrates an example of the open collection data structure.

FIG. 7 illustrates an example of an open collection data structure 700. Within the open collection data structure 700 may be a number of fields 701 through 703. For instance, the fields 701 and 702 might define the current collection definition for the collection. In the transactional log example, field 701 might represent the beginning transaction identifier, and field 702 might represent a current latest transaction identifier. The open collection data structure 700 could also include a "can close" bit 703, representing that the collection segment has reached the predetermined threshold (and thus branched along "Yes" in decision block 503). The open collection data structure 700 may also include other fields as represented by ellipses 704). The method 500 causes there to be only one open collection at a time. This is because the method 500 is not re-performed until the prior iteration of the method 500 has completed act 508, resulting in the collection record being inserted into the log, and thereby initiating the method 500 for the next collection along the "Yes" branch in decision block 501. Accordingly, there need only be a single open collection data structure 700 at a time. This simplicity allows for high volume in handling collections since each collection passes through the open collection segment data structure 700 as a gateway, allowing the collections to be processed by a single thread and managing all information in a small data structure in a lockless manner. The open collection data structure 700 may be changed millions of times a second. Accordingly, in the transactional log example, the open collection data structure 700 may be used to handle millions of transactions per second.

Figure 8:
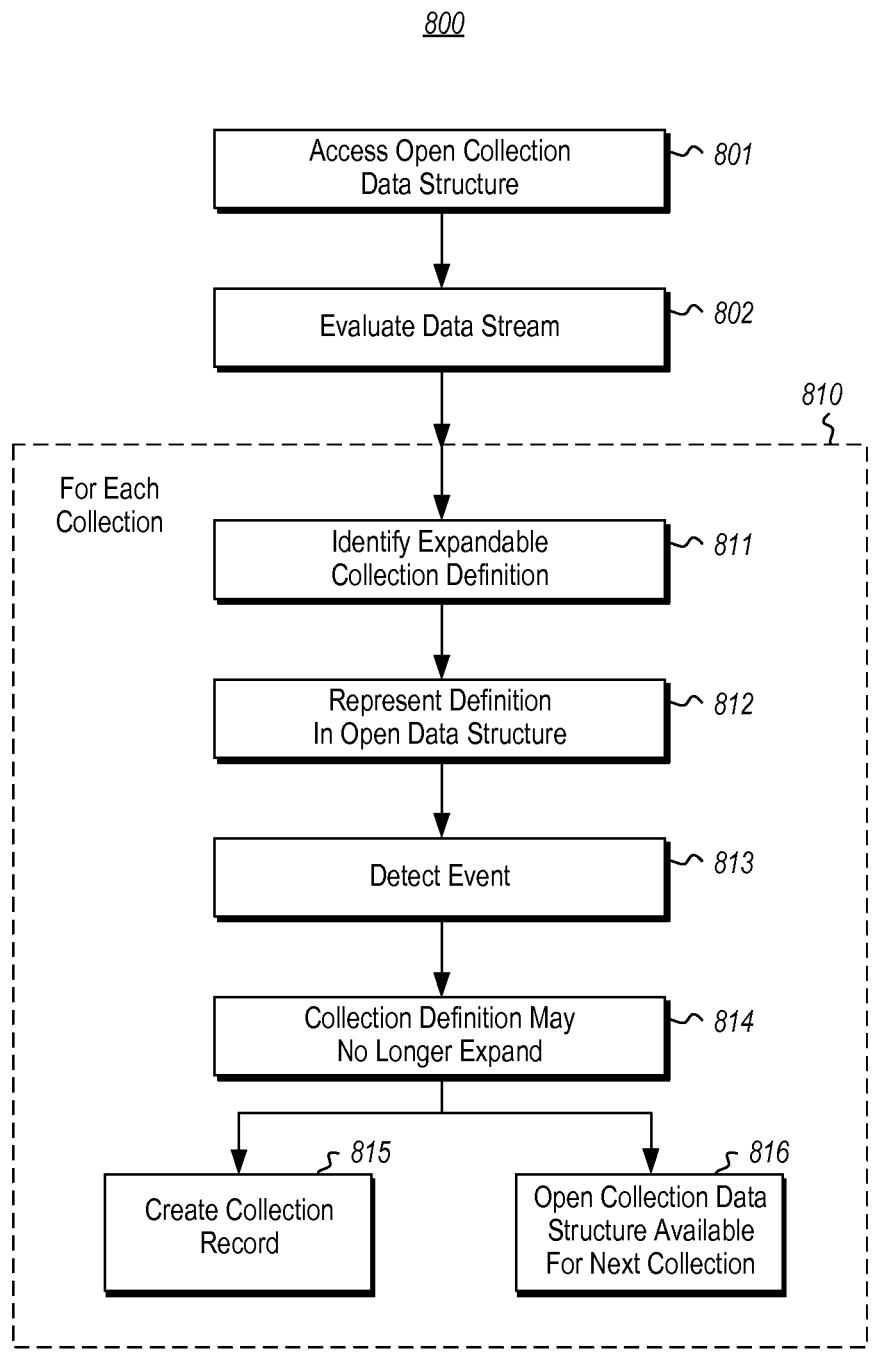
FIG. 8 illustrates a flowchart for a method for using an open collection data structure to create a sequence of collection records.

FIG. 8 illustrates a flowchart for a method 800 for using an open collection data structure to create a sequence of collection records. The method 800 includes accessing the open collection data structure (act 801) and evaluating a log that includes multiple log entries associated with different collections (act 802). For instance, the computing system 100 of FIG. 1 may access the open collection data structure 700 of FIG. 7 (act 801), and also begin evaluation of the log 200 (act 802). In accordance with act 810, the open collection data structure is then used to create the sequence of collection records.

Specifically, as part of the act 810, the system identifies an expandable collection definition associated with an open collection for which a collection record is to be created (act 811). This was described above with respect to act 502 and event 504 of FIG. 5. So long as the event 504 is active due to the collection being in an open state, the collection definition remains expandable. The collection definition while expandable may at least in some instances be expanded to include log entries of a particular data type if the last data item of that particular data type is encountered in the log. For instance, as described above, upon detection of event 504, the open collection definition may expand.

The method 800 then includes representing the expandable collection definition within the open transaction segment data structure (act 812). For instance, the collection data structure 700 has been described as representing the collection definition within field 701. The field 701 may include an internally descriptive definition, or may simply point to another location that defines a full collection definition.

Furthermore, upon detecting an event (act 813), it is determined that the collection definition is no longer expandable. This has been described above with respect to the event 504 causing the collection definition to expand, but once the collection segment is determined to have encountered the particular threshold ("Yes" in decision block 503), it is determined that the collection definition may no longer expand (act 814). In response, the collection record is created (act 507 and also act 815). Also, the open collection data structure is made available for use by the next collection (act 816). Note that act 816 is shown in parallel with act 815 to represent that there is no time dependency between the two acts. That said, unless the collection record for the current collection is generated, the next collection is not closed. However, at the same time, when the current collection is marked as full (act 814) (meaning it can no longer expand), events are classified to the next collection—meaning that the next collection is open for allocation often even before the collection record is written to the data stream itself.

When creating a sequence of collection records in this manner, there is a rather non-intuitive benefit that is achieved during recovery of the system. Specifically, the beginning of the tail of the log may be identified with respect to a location of a collection record in a manner that is i) analytically correct, ii) statically determined, and iii) efficient. Analytically correct means that (a proof can be employed about why this value is correct based on the rules employed for building collections. Statically determined means that this value is found not by scanning and analyzing the log, but simply by remembering the location of the collection record before the last collection record. In other words, rather than being computed—which would take time—this value has the advantage of being a well-known point. Efficient means that the location has the benefit of being close to the end of the log, compared to other well-known values for beginning the tail of the log, such as the beginning of the log.

For instance, when recovering, checkpointed data is first recovered. After the checkpointed data is recovered, the tail of the log is applied to bring the system current to a particular time. This is done by redoing the tasks identified in the tail of the log.

Accordingly, in order to know that applying the tail of the log will address tasks performed after the last collection fully checkpointed within the checkpointed data, it is important to have an understanding that there are no task to be performed prior to the tail of the log that belong to collections of events that were completed after the last collection fully checkpointed within the checkpointed data. Non-apparently, if forming the collection records in accordance with the above method, there will be no events that belong to a collection that is subsequent to last collection fully checkpoint that are prior to the location of the collection record corresponding to the next to last record fully checkpointed in the checkpointed data. Because this result in not apparent, a logical proof will now be provided.

First, various definitions used in the proof will be provided. A "Checkpoint" is defined as a set of records that have been saved to storage and no longer need the log. This set forms the starting point for recovery. A "Tail of the Log" is defined as the set of records that represent events that happened after the events that are captured by the Checkpoint. This set of records amends the records already present in the Checkpoint. A "Recovery LSN" is defined as a location in the log with the property that no record older than Recovery LSN can be in the Tail of the Log. In other words, all records older than Recovery LSN are part of the Checkpoint.

What we want to prove is that given a checkpoint C, the Recovery LSN for C can be chosen to be the segment definition for the segment before the last segment contained in C. In other words, if segment N+1 is the last segment already saved in C, we want to prove that the definition record for segment N has the property that no transaction record that is not yet included in C (a record which follows in the tail of the log after C) can exist in the log before the segment definition for segment N.

For this proof, the following rules for closing segments are given. First, a segment definition for segment N is only written to the log after all the transactions in segment N have been written. Second, segment N+1 becomes eligible for closing only after the definition for segment N is written to the log. We are also given checkpoint C which contains segment N and segment N+1 and a recovery LSN which equals the definition record for segment N.

Given this, the proof (which uses the absurdity methodology) is as follows. First, assume there was a record R such that the record is both older than Recovery LSN and the record belong to the Tail of the Log. This means that R will not be part of the checkpoint C. Second, since the LSN of R<Recovery LSN, it must be true that R was written before the segment N definition was written. This is because we have chosen Recovery LSN to be equal to the definition of segment N. Based on that, and also given that segment N+1 becomes eligible for closing only after the definition for segment N is written to the log, this means that at the time when R was written, segment N+1 was not yet eligible to be closed. Based on that fact, it means that R must have belonged to segment N+1 or earlier—because, if segment N+1 was not eligible for closing, it means that segment N+2 could not even have existed when R was written. But if R belongs to segment N+1 or older, it means that R belongs to C—which directly contradicts our starting hypothesis that R will not belong to C.

Figure 9:
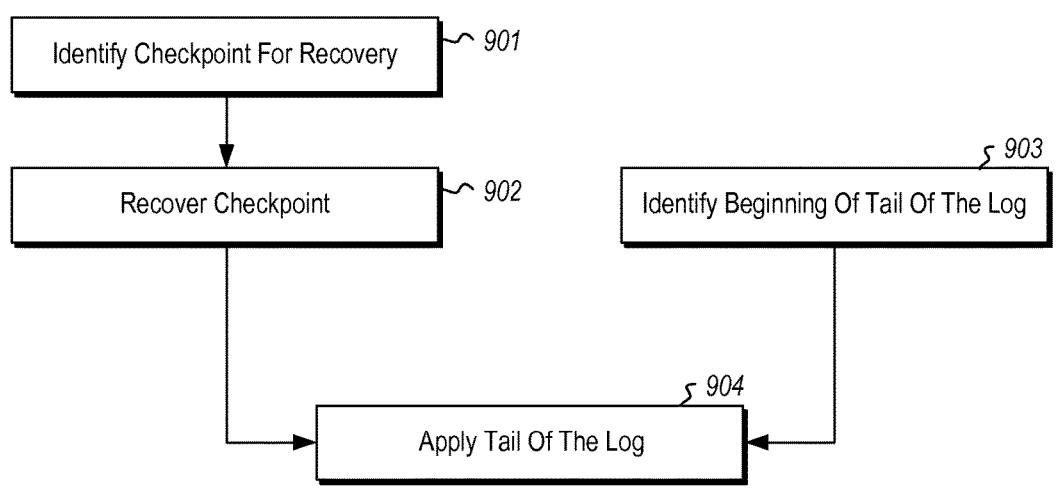
FIG. 9 illustrates a method for recovering in a system that has multiple collections of events, each collection having associated therewith a collection record in a log, the collection records being ordered by the same order as the last event in each collection are encountered in the log.

FIG. 9 illustrates a method 900 for recovering in a system that has multiple collections of events, each collection having associated therewith a collection record in a log. A checkpoint for recovery is identified (act 901), and the corresponding checkpointed data is recovered into the system (act 902). Methods for identifying and recovering checkpoints are known in the art, and thus will not be described herein.

Figure 10:
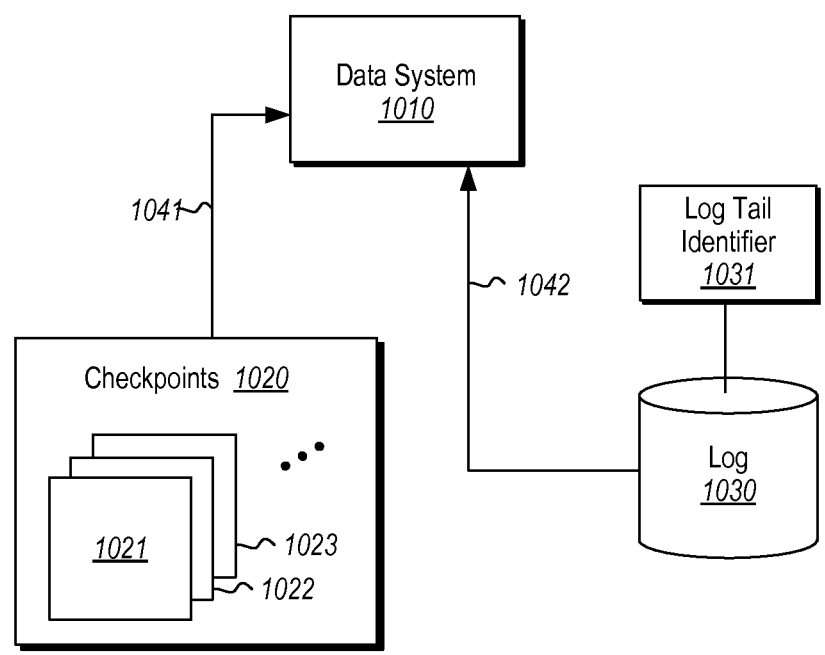
FIG. 10 illustrates a recovery environment in which a data system is to be restored using the recovery method of FIG. 9.

For instance, FIG. 10 illustrates a restoration environment 1000 in which a data system 1010 is to be restored. A computing system (such as the data system) identifies which of potentially multiple checkpoints 1020 are to be restored to the data system. For instance, by way of example, the available checkpoints 1020 are illustrated as including checkpoint 1021, 1022 and 1023, although the ellipses 1024 represent that there may be other checkpoints as well. Suppose the computing system chooses a most recent checkpoint 1021 to be restored into the data system (act 901). The computing system the restores the checkpoint 1021 into the data system (act 902) as represented by arrow 1041.

In addition, a beginning of the tail of the log is identified (act 903). After the checkpointed data is recovered (act 902), the tail of the log is applied (act 904) by redoing the tail of the log from the identified beginning of the tail of the log. For instance, a log tail identification module 1031, which may (but need not) be part of the data system 310) identifies the beginning of the tail of the log, and then applies the tail of the log beginning at the identified beginning (as represented by arrow 1042).

According to the above proof, there can exist no events from a collection that is completed in the log after the last collection fully encompassed within the checkpointed data that is prior to a location in the log of the location of the collection record associated with the next to last collection fully encompassed in the checkpointed data. Accordingly, the next to last collection record within the checkpointed data is identified as the location of the beginning of the tail of the log. Although not needed, some number of events prior to the next to last collection record may also be included within the log. For instance, the tail of the log might go as far back as the third to last checkpointed record in the checkpointed data. However, this is not necessary, and is only mentioned to avoid easy design around of this patent application, and to support the claims.

For instance, consider the log 200 of FIG. 2. Perhaps all of the events within collections 201 and 202 are fully contained within the checkpoint 1021, but that not all events within the collection 203 are fully contained within the checkpoint. This would mean that the last collection of events fully contained within the checkpoint 1021 would be checkpoint 202. The next to last collection of events fully contained within the checkpoint 1021 would thus be collection 201. The collection record for collection 201 is collection record 211. Accordingly, from the above proof, it is shown that there are no events belonging to collection 203 that are prior to the collection record 211 within the log 200. Accordingly, collection record 211 may be identified as the beginning of the tail of the log to be applied after recovering the checkpoint 1021.

Because the tail of the log may be identified as beginning quite late within the log, the tail of the log may be kept quite short, thereby significant speeding up the recovery process. Accordingly, the principles described herein provide an effective mechanism to recover from system failure by efficiently identifying and applying the tail of the log.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon computer-executable instructions that are executable by the one or more processors to recover the computing system using a log comprising multiple collections of events and checkpointed data including a last collection of events, the computer-executable instructions including instructions that are executable to cause the computing system to perform at least the following:
   identify a data stream comprising a sequence of events associated with the computing system;
   separate the sequence of events into a sequence of a plurality of collections of events within a log, each event collection comprising a plurality of events that have one or more common attributes;
   generate a corresponding collection record for each of the plurality of event collections, each given collection record being recorded within the log after completion of the corresponding event collection;
   in response to a failure, recover data within the computing system, including at least:
      recovering the checkpointed data in the computing system, the checkpointed data comprising a saved subset of the log that includes a subset of the plurality of collection records and a subset of the plurality of event collections;
      within the log of a sequence of collection records and event collections, determining that a beginning of a tail of the log is located at or before a location of a next-to-last collection record corresponding to a next-to-last event collection that is located immediately prior to the last event collection, the last event collection comprising a most recent collection of events that is included within the checkpointed data, and the next-to-last event collection comprising a second most recent event collection that is included within the checkpointed data; and
      after recovering the checkpointed data, restoring the computing system by performing each event of the log from the identified beginning of the tail of the log onward.

2. The computing system in accordance with claim 1, the beginning of the tail of the log also being identified as being at a location within the log that is after a location within the log of a collection record for a third to last collection of events included in the checkpointed data.

3. The computing system in accordance with claim 1, the multiple collections of events being multiple collections of task entries.

4. The computing system in accordance with claim 3, the multiple collections of task entries each being associated with a set of one or more transaction identifiers.

5. The computing system in accordance with claim 4, the set of one or more transaction identifiers for any given collection of task entries not overlapping the set of one or more transaction identifiers of any other collection of task entries.

6. The computing system in accordance with claim 4, the set of one or more transaction identifiers for at least one of the multiple collections of task being a plurality of transaction identifiers.

7. The computing system in accordance with claim 6, the plurality of transaction identifiers being a transaction identifier range.

8. The computing system in accordance with claim 1, the checkpointed data including a plurality of events for one or more collections after the last collection of events contained in the checkpointed data.

9. The computing system in accordance with claim 1, the collection record for each of the multiple collections occurring in the log after a last event of the corresponding collection.

10. The computing system in accordance with claim 9, the log including a plurality of collection records that are ordered by order of encountering last events of the multiple collections in the log.

11. The computing system in accordance with claim 1, the log including a plurality of collection records that are ordered by order of encountering last events of the multiple collections in the log.

12. A method, implemented at one or more computer processors, for recovering in a system that has multiple collections of events, each collection having associated therewith a collection record in a log, the method comprising:
identifying a data stream comprising a sequence of events associated with the computing system;
separating the sequence of events into a sequence of a plurality of collections of events within a log, each event collection comprising a plurality of events that have one or more common attributes;
generating a corresponding collection record for each of the plurality of event collections, each given collection record being recorded within the log after completion of the corresponding event collection;
in response to a failure, recovering data within the computing system, including at least:
recovering checkpointed data in the system, the checkpointed data comprising a saved subset of the log that includes a subset of the plurality of collection records and a subset of the plurality of event collections; within the log of a sequence of collection records and event collections, determining that a beginning of a tail of the log is located at or before a location of a next-to-last collection record corresponding to a next-to-last event collection that is located immediately prior to a last event collection, the last event collection comprising a most recent collection of events that is included within the checkpointed data, and the next-to-last event collection comprising a second most recent event collection that is included within the checkpointed data; and
after recovering the checkpointed data, restoring the computing system by performing each event included within the tail of the log in the system from the identified beginning of the tail of the log.

13. The method in accordance with Calm 14, the beginning of the tail of the log also being identified as at a location within the log that is after a location of a collection record for a third to last collection of events included in the checkpointed data.

14. The method in accordance with claim 12, the multiple collections of events being multiple collections of task entries.

15. A computer program product comprising one or more hardware storage devices having stored thereon computer-executable instructions that are structured such that, when executed by one or more processors of a computing system, the computer-executable instructions cause the computing system to perform a recovery in a system that has multiple collections of events, each collection having associated therewith a collection record in a log, the computer-executable instructions being executable to cause the computing system to perform at least the following:
identify a data stream comprising a sequence of events associated with the computing system; separate the sequence of events into a sequence of a plurality of collections of events within a log, each event collection comprising a plurality of events that have one or more common attributes;
generate a corresponding collection record for each of the plurality of event collections, each given collection record being recorded within the log after completion of the corresponding event collection;
in response to a failure, recover data within the computing system, including at least:
recovering checkpointed data in the system, the checkpointed data comprising a saved subset of the log that includes a subset of the plurality of collection records and a subset of the plurality of event collections;
within the log of a sequence of collection records and event collections, determining that a beginning of a tail of the log is located at or before a location of a next-to-last collection record corresponding to a next-to-last event collection that is located immediately prior to a last event collection, the last event collection comprising a most recent collection of events that is included within the checkpointed data, and the next-to-last event collection comprising a second most recent event collection that is included within the checkpointed data; and
after recovering the checkpointed data, restoring the computing system by performing each event of the log from the identified beginning of the tail of the log onward.

16. The computer program product in accordance with claim 15, the beginning of the tail of the log being identified as at a location within the log that is after a location of a collection record for a third to last collection of events included in the checkpointed data.

17. The computer program product in accordance with claim 15, the multiple collections of events being multiple collections of task entries, the multiple collections of task entries each being associated with a set of one or more transaction identifiers, the set of one or more transaction identifiers for any given collection of task entries not overlapping the set of one or more transaction identifiers of any other collection of task entries.

18. The computer program product in accordance with claim 15, the collection record for each of the multiple collections occurring in the log after a last event of the corresponding collection, the log including a plurality of collection records that are ordered by order of encountering last events of the multiple collections in the log.

* * * * *